March 3, 1953 — E. A. JOHNSON — 2,630,562

DATA ENCODING SYSTEM

Filed April 25, 1949 — 3 Sheets-Sheet 1

E. A. Johnson
*Inventor*

By Moore and Hall
*Attorneys*

March 3, 1953 E. A. JOHNSON 2,630,562

DATA ENCODING SYSTEM

Filed April 25, 1949 3 Sheets-Sheet 2

E.A.Johnson

*Inventor*

By Moore and Hall

*Attorneys*

March 3, 1953

E. A. JOHNSON 2,630,562

DATA ENCODING SYSTEM

Filed April 25, 1949

3 Sheets-Sheet 3

E. A. Johnson

*Inventor*

By Morse and Hall

*Attorneys*

Patented Mar. 3, 1953 2,630,562

UNITED STATES PATENT OFFICE 2,630,562

DATA ENCODING SYSTEM

Eric Arthur Johnson, Malvern, England, assignor to Minister of Supply in His Majesty's Government of the United Kingdom of Great Britain and Northern Ireland, London, England Application April 25, 1949, Serial No. 89,534
In Great Britain April 28, 1948

10 Claims. (Cl. 340—347)

The present invention relates to apparatus for encoding information. The invention is particularly, although not exclusively, concerned with systems for conveying information of the kind in which the information to be converted is capable of being represented as a rotation of a shaft. Such systems are used in the transmission of positional data from object locating systems such as radar systems to remote points, for telemetering and like purposes.

It is an object of the present invention to provide an encoding apparatus for purposes such as the above which will enable information to be presented in the form of a multidigit code operating, for example, on a so-called binary scale.

A further object of the invention is to provide a data encoding system for representation of information in the form of a digital code which will have a high degree of accuracy.

Yet another object of the invention is to provide such a system in which a high degree of accuracy is combined with reliability and robustness.

Further objects of the invention will appear as the description proceeds.

It is known that numbers may be represented by means of binary codes, according to which, any desired number may be built up as a sum of successive powers of 2. Thus, for example, the number 10 may be written as $2+2^3$, the number 14 may be written as $2+2^2+2^3$, the number 15 by $1+2+2^2+2^3$ and so on. Any number within a certain range may, therefore, be represented by the presence or absence of the powers of 2 from 0 to $n$ where $n$ is the highest power of 2 required for any number in the range and the presence or absence of the representative powers of 2 may be indicated by the presence or absence of a signal. Such an arrangement is employed, for example, in Baudot systems of telegraphy in which a 5-unit code of pulses is used to represent any one of 32 characters which could, of course, be the numbers 1–32.

If now the rotation of a shaft is divided into fractions, the position of the shaft may always be represented as a part of a turn representing a certain number of such fractions and it is then necessary, in order to convey the position of the shaft merely to indicate the number of basic fractions of a turn through which the shaft has moved from the datum position. If the smallest fraction of a turn it is desired to consider is $\frac{1}{64}$, the position of the shaft can at any time be reproduced by transmitting one of the numbers 1 to 64. This can be achieved by means of a siximpulse code. Since, however, in general it will be desired to transmit the angular position of the shaft to a greater degree of accuracy it will normally be necessary to provide a low speed arrangement for transmitting the angular position of the shaft to the nearest $\frac{1}{64}$ turn and to provide a high speed or fine reading shaft, geared to the first and representing by each rotation a fraction only of the main shaft rotation. The position of this fine reading shaft can then likewise be transmitted to the nearest $\frac{1}{64}$ turn by means of a six-digit code. By these means any desired degree of accuracy may be obtained in the transmission of angular positions by employing a sufficient number of fractional divisions of the shaft rotations, a sufficient number of shafts geared together to multiply the shaft rotation, and a sufficient number of digits to represent by binary or like code, the positions of all the geared shafts of the system.

The present invention is based on the above described principle of transmitting shaft rotations by reference to a binary code.

In order that the invention may be more clearly understood, reference will now be made to the accompanying drawings which illustrate diagrammatically some forms which the apparatus proposed, according to the invention, may take.

Figure 1:
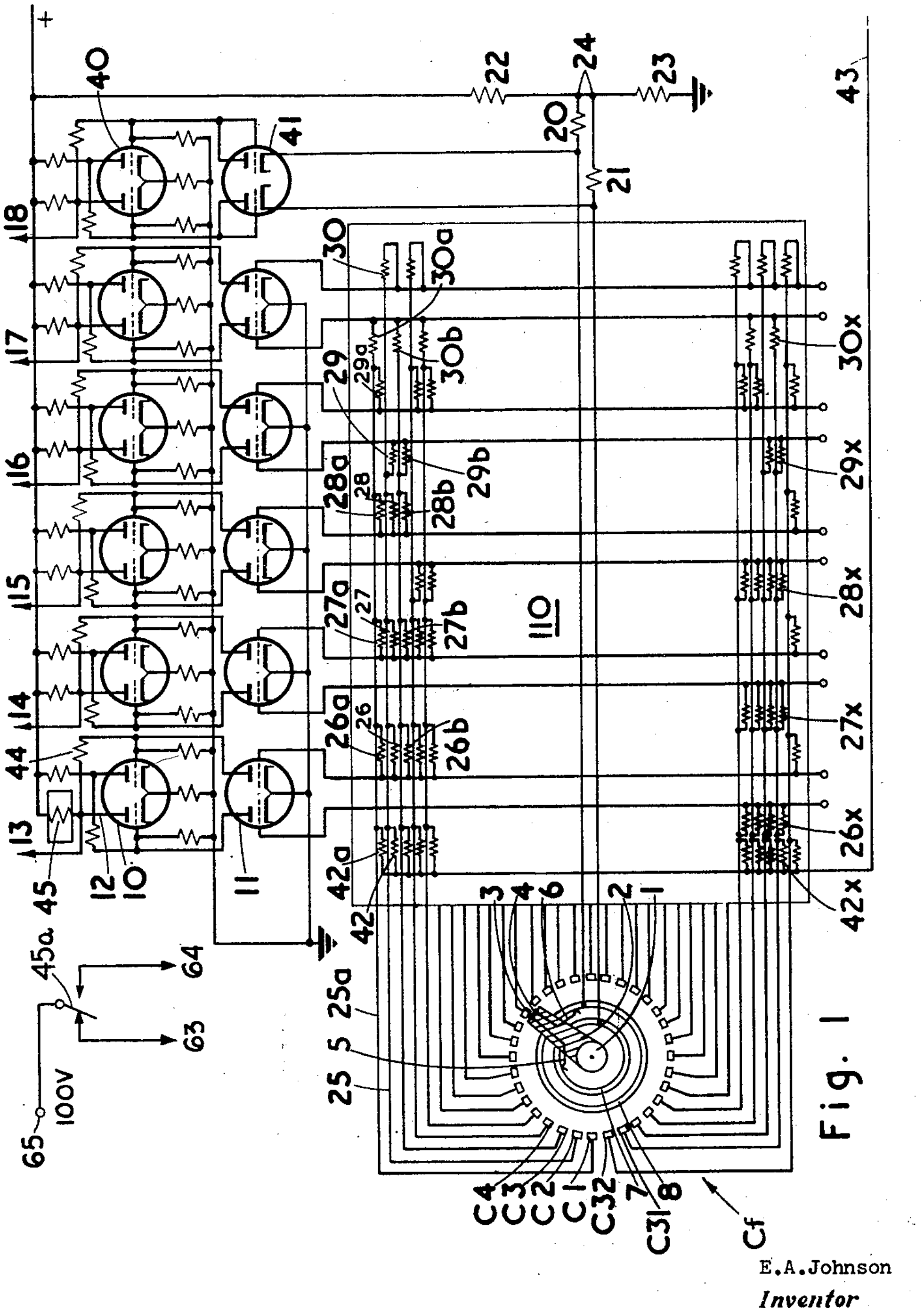
Fig. 1 is a circuit diagram of an encoding apparatus according to the invention.

Referring first to Fig. 1, shaft 1, the position of which represents the information to be encoded, drives a wiper arm 2 carrying at its outer end a pair of wiper contacts 3 and 4 which are connected via brushes 5 and 6 to slip rings 7 and 8 respectively. The wiper contacts 3 and 4 are moved over fixed commutator contacts *c1*, *c2*, *c3* . . . *c32* which are arranged at a spacing such that only one wiper contact can be in contact at a time with one of the fixed contacts, and which enable an angular position of the shaft to be designated to the nearest $\frac{1}{64}$ of complete rotation in a manner to be later described.

The information represented by the position of shaft 1 is required to be represented by a code employing six component digits. Accordingly, six output circuits corresponding to the six component digits are provided; these six circuits with one exception are alike and only one of them need, therefore, be described in detail. The output circuit comprises a double triode valve 10 connected as an Eccles-Jordan pair, the two grids being connected to the anodes of a double triode amplifier which in turn has its grid connected to two lines which may be referred to as respectively the "1" and the "0" lines. It will thus be seen that according to the respective voltages applied to the grids of the double triode amplifier, the Eccles-Jordan pair will be set to either a high or a low voltage at the anode 12 to which the output line 13 is connected. Thus the six output lines 13 to 18 may have set up upon them either high or low voltages corresponding to "mark" or "space" that is to say, according to whether the binary number it is desired to transmit at any time in order to represent the shaft position contains a "1" or a "0" in the position to which the output lead corresponds.

In order that the correct voltages shall be set up at the output leads 13 to 18, the grids of the twin triode amplifier valves are connected through their "1" and "0" lines to a network of resistors which are connected in accordance with the desired code to the individual commutator contacts *c1*, *c2* . . . *c32*. The slip rings 7 and 8 are connected through resistors 20 and 21 to a D. C. potentiometer comprising resistors 22 and 23 connected between high tension supply and earth and arranged to give, at the point 24, a voltage in the neighbourhood of say 150 volts. It will thus be seen that with the wiper contact 3, for example, in contact with fixed contact say *c2*, a positive voltage will be applied from the point 24 through resistor 21, slip ring 7 brush 5 and contact 3 to fixed contact *c2* and thence through the line 25 and resistor 42 to a negative bias line 43 at —6 volts. The line 25 is also connected to the "0" line of the first output amplifier through resistor 26, to the "0" line of the second output amplifier via the resistance 27, to the "0" line of the third output amplifier through the resistor 28, to the "1" line of the fourth amplifier through the resistor 29 and to the "0" line of the fifth amplifier through the resistor 30. All these lines will thus be raised to a voltage in the neighbourhood of —2 volts. The corresponding triode portions of the amplifier valves will, therefore, conduct. The other triode portions of the amplifier valves will be connected through their respective resistors of the network to the negative bias line 43 and will not therefore conduct. Considering now, therefore, the amplifier 11, the left-hand triode portion will be non-conducting while the right-hand triode portion will, as above described, be rendered conductive. It follows that the left-hand anode will be at a high potential and the right-hand anode at a relatively low potential determined by the anode current and the values of resistors 44 and 45. In valve 10, therefore the left-hand grid will be at high potential and the right hand grid at relatively low potential so that the left-hand portion of the valve will conduct and the right-hand portion will not conduct. The current in the left-hand portion will produce a voltage drop in resistor 45 so that the voltage appearing on the output line 13 will be below the high-tension supply, this relatively low potential being indicative of "0." This state of affairs will obtain also in the circuits of the remaining two state circuits except those connected to output lines 16 and 18. In the case of output line 16, the right-hand portion of the two state valve circuit will be conductive so that the voltage on output line 16 will be at full high-tension voltage (there is no current in the left-hand triode portion of the valve) corresponding to a "1" indication. The Eccles-Jordan pairs will, therefore, be set so that at the outputs 13, 14, 15, 16 and 17, voltages will appear corresponding to 0, 0, 0, 1 and 0 respectively. This characterises contact *c2* and could be set up also by wiper contact 4 being in contact with fixed contact *c2*. In the same way, if we consider commutator contact C1, this is connected through line 25*a* and resistor 42*a* to the negative bias line 43 and is further connected through resistors 26*a*, 27*a*, 28*a*, 29*a*, and 30*a* to the "0" line of the first amplifier, the "0" line of the second amplifier, the "0" line of the third amplifier, the "0" line of the fourth amplifier and the "1" line of the fifth amplifier so that if this contact C1 is in contact with either wiper contact 3 or 4 the output lines 13, 14, 15, 16 and 17 will be energised with voltages corresponding to 0, 0, 0, 0, and 1 respectively, characterising contact C1. Contact C3, as the drawing shows, is interconnected with the "0" and "1" lines of the five amplifiers by way of resistors 26*b*, 27*b*, 28*b*, 29*b*, and 30*b* so as to set up on the output lines, in the same way as above described for contact C2, voltages corresponding to 0, 0, 0, 0, 1 and 1, characterising contact C3 and so on, throughout the range of thirty-two contacts, the digital representation set up at the output lines changing from contact to contact according to the well-known binary system of numbering. As further illustration it will be seen from the drawing that contact C31 is connected through resistor 42*x* to the bias line 43 and through resistors 26*x*, 27*x*, 28*x*, 29*x* and 30*x* to all the "1" lines, of the five amplifiers so that the output lines will all be energised with voltages corresponding to "1" when this contact is selected by the wiper contact. The binary number 11111 thus set up corresponds to 16+8+4+2+1=31. Contact C32, on the other hand is connected to all the "0" lines so that the number 00000 is set up on the output lines when the wiper contact 3 or 4 reaches contact C32. The next number in the binary scale is 00001 and will be set up by contact of the wiper contact 3 or 4 with contact C1 as above described. Now, it will be seen that the sixth output circuit comprising the double triode Eccles-Jordan pair 40 and double triode 41 connected as a double diode which supplies the output 18 has the cathodes of the valve 41 connected separately to the two slip rings 7 and 8 respectively. Thus one or other of the two portions of valve 41 will be conducting or non-conducting according to which of the wiper contacts 3 and 4 is in contact with a fixed contact *c1*, *c2* etc. Thus if contact 4 is, as shown in the drawings, not making contact at all, the right hand triode portion will have its cathode maintained at 150 volts, while with contact 3 making contact with contact *c2*, the left hand cathode will be connected through resistor 42 to the negative bias line 43 at —6 volts, its cathode potential being thus reduced to about +60 volts. Thus the left hand portion of valve 41 will conduct, the left hand portion of the Eccles-Jordan pair 40 will be cut-off and a positive voltage will appear at the output 18 indicating the digit "1." Obviously, if wiper contact 4 is in contact with the contact C2 and wiper contact 3 is not making contact at all the state of the two-state circuit will be the reverse of that just described so that a lower voltage, indicating "0" will appear at the output line 18.

It will now be seen that with either contact 3 or contact 4 in contact with any given contact of the commutator (C1, C2 . . . etc.) a code combination of voltages will be set up on the output lines 13, 14, 15, 16 and 17 characteristic of that contact. This determines the position of shaft 1 to the nearest $\frac{1}{32}$ turn. The voltage on output line 18, however, will as above described, be determined by which of the two wiper contacts 3 and 4 is in fact in contact with the particular commutator contact. The position of the shaft 1 to the nearest $\frac{1}{64}$ turn will thus be given by the code combination of voltages appearing on all the output lines 13 . . . 18.

It will thus be seen that the shaft position will be characterised as to the last $\frac{1}{64}$ turn by reference to which of the wiper contacts 3 and 4 is making contact at the time. For the correct operation of this circuit it is obviously necessary that the spacing of the wiper contacts 3 and 4 and of the fixed contacts c1, c2 etc. should be such that only one of the wiper contacts can make contact at a time. It will, moreover, be appreciated that with neither brush in contact the condition last set up will be maintained by the output circuits.

Not all the resistors interconnecting the contacts c1, c2 etc. with the output circuits have been shown in the drawing. It will be appreciated, however, that the interconnection can be effected in such a way that the appropriate combination of "mark" and "space" voltages can be set up at the outputs 13 to 18 to characterise by the binary system of coding above described any one of 64 possible positions of the input shaft 1.

Figure 2:
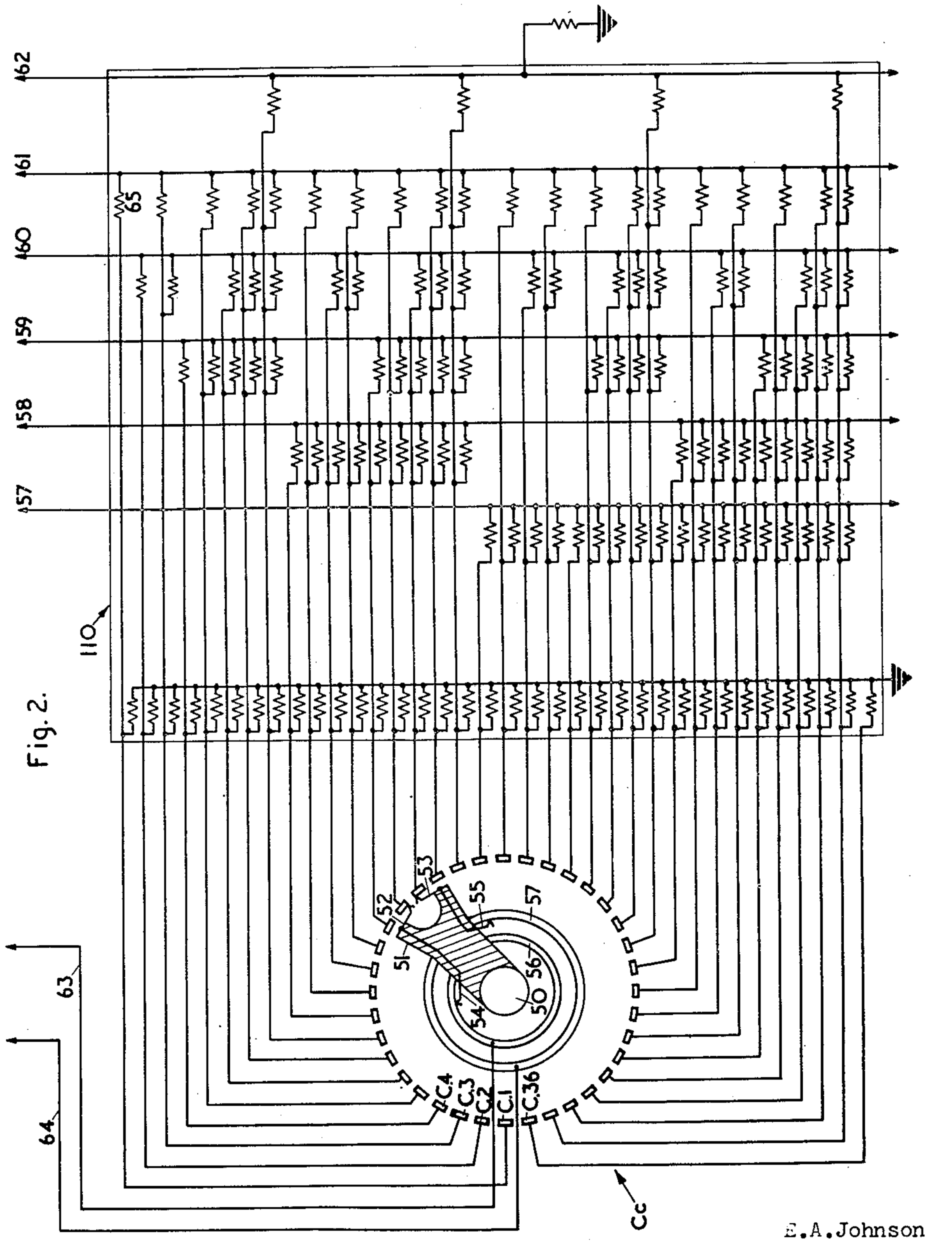
Fig. 2 is a circuit diagram of an alternative form of encoding apparatus which may be used alone or in conjunction with an arrangement such as that shown in Fig. 1.

Referring now to Fig. 2, the arrangement shown here may be used in place of that previously described with reference to Fig. 1, but is shown here as designed to supplement the arrangement of Fig. 1. The input shaft 50 is geared to the input shaft 1 of Fig. 1 by a ratio of 36:1 so that one rotation of the shaft 50 corresponds to 36 rotations of the shaft 1. The arrangement now to be described, therefore, constitutes the coarse dial of the data transmitting system. In such a dual arrangement it will be necessary to provide for the information from each encoding arrangement to be coordinated so that at all times a coherent binary number may be used to represent the positions of both shafts. The manner in which this is achieved will be made apparent later.

In the arrangement of Fig. 2, the shaft carries a wiper arm 51 provided with brush contacts 52 and 53 connected to brush contacts 54 and 55 respectively which operate on the slip rings 56 and 57, also respectively. Brush contacts 52 and 53 operate on a ring of, in this case, 36 commutator segments C1, C2 . . . C36. As before, six output leads 57–62 are provided and these are interconnected with the commutator segments C1, C2 etc. through a resistance network, only part of which is shown, according to the code employed the details of which will be discussed below. The commutator slip rings 56 and 57 are connected through leads 63 and 64 respectively to the fine transmitter in a manner to be described later.

Consider first the brush 52 in contact with commutator segment C1. This segment is connected to output line 61 through resistor 65 and only to this output line. This connection energises this line, indicating, according to the code, the digit 1 which characterises segment C1. In the same way the brush 52, connected to any other segment will energise the appropriate output lines through the appropriate resistors of the network to set up in these lines a combination of digits characteristic of the respective segment. Similarly, brush 53 can connect to any one of the segments to set up the appropriate digit code. The purpose of the two brushes is to ensure correct take over between the coarse and fine transmitters, that is to say, the transmitters of Figs. 1 and 2. Thus, as the fine transmitter completes a revolution in, say, a clockwise direction, the coarse transmitter will be passing from one commutator segment to the next. The binary number representing the fine shaft position will change at the zero mark from 111111 to 000000 and the coarse transmitter is so geared to the fine that at this point its leading brush 53 is just in contact with the next commutator segment while the trailing brush 52 is about to leave the previous segment. However, brush 52 is arranged to be energised when a "1" is set up in the output channel of the highest denomination in the fine transmitter and brush 53 is arranged to be energised only when a "0" is set up in that channel. Thus, as the fine transmitter changes over from 111111 to 000000 the coarse transmitter changes from brush 52 to brush 53 and coordination is ensured.

The outputs from the fine and coarse transmitters constitute a composite binary number which represents the position of the main input shaft to a degree of accuracy determined by the number of fractions into which the fine and coarse transmitter shaft rotations are divided and the ratio by which they are geared together. In the present example, the fine transmitter has been given 32 segments and an arrangement of two brushes which enables the position of the fine shaft to be designated to the nearest $\frac{1}{64}$ turn. The ratio between the fine and coarse shaft rotations is 36:1 and the fractions of a turn represented by the digits in the output circuits of the coarse transmitter are $\frac{1}{2}$, $\frac{1}{4}$, $\frac{1}{9}$, $\frac{1}{18}$, $\frac{1}{36}$, and $\frac{1}{36}$. The complete coherent 12-digit number which may be derived from these two outputs in combination will, therefore, be capable of representing the rotation of the main input shaft to the nearest $\frac{1}{2304}$ of a turn, the respective digits representing $\frac{1}{2}$, $\frac{1}{4}$, $\frac{1}{9}$, $\frac{1}{18}$, $\frac{1}{36}$, $\frac{1}{36}$, $\frac{1}{72}$, $\frac{1}{144}$, $\frac{1}{288}$, $\frac{1}{576}$, $\frac{1}{1152}$ and $\frac{1}{2304}$ parts of a turn of the input shaft. These figures may be explained as follows: They have been chosen to provide a direct relation between the digital code and angular degrees and to fit a system for the transmission of angular rotations in which the fine shaft rotates once for each 10° rotation of the coarse shaft, that is to say in which the fine and coarse shafts are geared together by a ratio of 36:1. It was, moreover, preferred that the digits of the greatest significance should represent $\frac{1}{2}$ and $\frac{1}{4}$ of a turn respectively. Now $\frac{1}{4}$ of a turn is $\frac{576}{2304}$ of a turn so that for the corresponding digit to "take over" from the digits of lower significance it was necessary to arrange for the less significant digits to provide for counting up to $\frac{575}{2304}$ of a turn. It will be seen that the fractions $\frac{1}{9}$, $\frac{1}{18}$, $\frac{1}{36}$, $\frac{1}{72}$, $\frac{1}{114}$, $\frac{1}{288}$, $\frac{1}{576}$, $\frac{1}{1152}$ and $\frac{1}{2304}$ add up to $\frac{511}{2304}$ of a turn. By the addition of a further digit representing $\frac{1}{36}$ of a turn ($\frac{64}{2304}$ of a turn) this total is raised to the requisite $\frac{575}{2304}$. The complete 12 digit number therefore includes two digits (the fifth and sixth) both of which represent $\frac{1}{36}$ of a turn and any shaft position can be represented by the appropriate combination of digits to the nearest $\frac{1}{2304}$ of a turn. It will be appreciated, however, that where it is not important to represent shaft positions in angular degrees, direct use may be made of normal binary principles.

Figure 3:
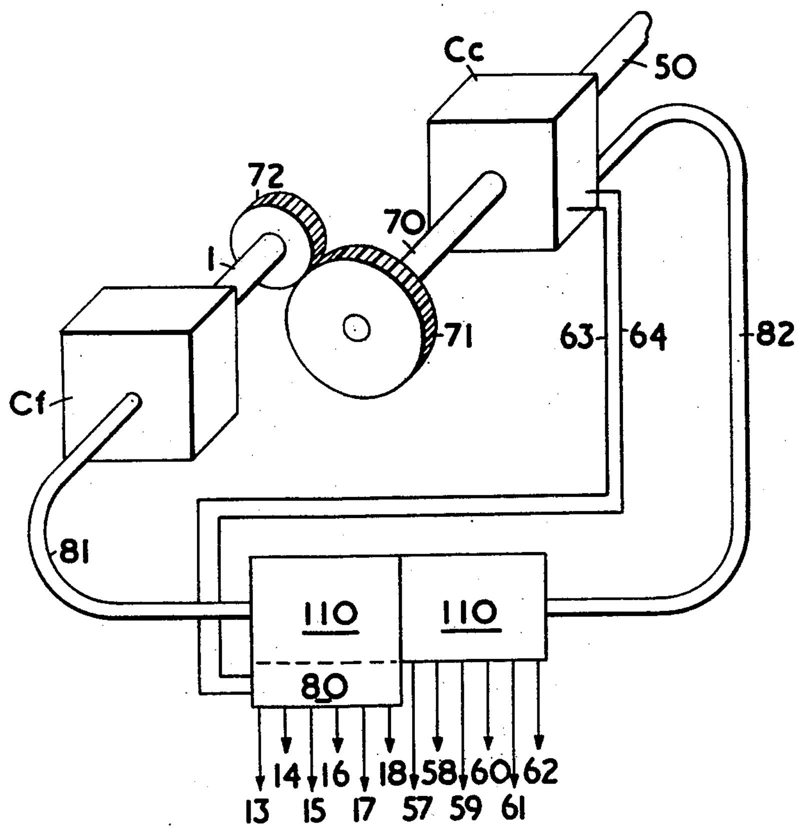
Fig. 3 shows diagrammatically a composite arrangement formed by the interconnection of two transmitter encoders according to Figs. 1 and 2 respectively.

The arrangement employed for combining the fine and coarse transmitters in a single apparatus is illustrated diagrammatically in Fig. 3. In the arrangement shown the information to be encoded is introduced through input shaft 50 of the coarse commutator $C_c$. A further shaft, 70, which may be integral with the shaft 50 so as to turn with the wiper arm of the coarse transmitter commutator, carries on its end a spur gear 71 which meshes with a spur gear 72 mounted on the intput shaft 1 of the fine transmitter commutator $C_f$, the gear ratio being 36:1. Leads 63 and 64 from the coarse transmitter commutator slip rings 56 and 57 are, as above described, connected to the output channel of highest denomination in the fine transmitter the electronic circuits of which are indicated in this figure by the general reference numeral 80. Multi-conductor cable 81 connects the fine transmitter commutator $C_f$ to the fine transmitter resistance network 110 and a similar multi-conductor cable 82 connects the commutator $C_c$ of the coarse transmitter to its resistor network 110.

The encoded information made available on the output circuits 13, 14, 15, 16, 17, 18, 57, 58, 59, 60, 61 and 62 (Fig. 3) may be required for use in a number of different ways. Commonly, however, systems according to the present invention will find application to problems involving the transmission of data over considerable distances. The transmission of this data may be effected in any desired manner. For example a 12-core cable may be fed directly from the output lines enumerated above so that at the remote end of the cable the voltages representing "mark" or "space," that is to say "1" or "0" in a binary system of notation will then be available at the remote point and can be applied to a decoding apparatus of any desired form. One form such apparatus may take is described in my co-pending application Serial No. 89,535 filed on even date herewith and entitled Data Decoding System.

In some circumstances it may be preferable to transmit signals representing the coded information appearing on the output lines above enumerated sequentially. The voltages appearing on these output lines may therefore be used to determine the nature of a signal to be transmitted. For example, a "mark" or "1" digit may be represented by a signal pulse of one polarity, width or amplitude or on a particular carrier frequency while a "space" or "0" digit is represented by a signal pulse of the opposite polarity or of a different width, amplitude or on a different carrier frequency. The appropriate signal combination can be read off from the output lines and transmitted sequentlially being re-assembled at the remote point. The link in this case may be a line or radio link. If the data appearing on the output lines is changing the sequential reading of this information by the transmitting means must be made to examine these outputs frequently, that is to say, the rate of transmission must be high in relation to the rate at which the information is changing. It will, in general, moreover, as will be apparent to those skilled in the art, be necessary to provide means for synchronising transmission of impulses representing the various digits of the code with the receiving apparatus, so that the various digits may be assigned their proper significance in the code.

The apparatus according to the invention is applicable to any problem requiring the conversion of information capable of being represented by a shaft rotation into a code number.

I claim:

1. Electrical information encoding apparatus comprising a commutator having a plurality of contact segments and a movable wiper arm having two contact points alternately in contact successively with said contact segments, said contact segments and contact points being so dimensioned with respect to one another that only one contact point makes contact at a time, a plurality of code element circuits each peculiar to a code element of a multi-digit code and each comprising a "mark" channel and a "space" channel, coding circuits affording connection from each of said contact segments to a different combination of "mark" and "space" channels in accordance with said multi-element code, an output circuit associated with each of said code element circuits, means interconnecting said output circuits with their respective code element circuits for applying one voltage to a given output circuit in response to energisation of the corresponding "mark" channel and a different voltage to said output circuit in response to energisation of the corresponding "space" channel, a source of voltage connected to the two contact points of said wiper arm, a further code element circuit and associated output circuit, a connection between the "mark" channel of said further code element circuit and one of said contact points and a connection between the "space" channel of said further code element circuit and the other of said contact points.

2. Electrical information encoding apparatus comprising a commutator having a plurality of contact segments and a movable wiper arm having two contact points alternately in contact successively with said contact segments, only one of said contact points making contact at a time, a plurality of code element circuits each peculiar to a code element of a multi-digit code, coding circuits affording connection from each of said contact segments to a different combination of said code element circuits, a source of voltage and means for connecting said source of voltage alternatively to one or the other of the two contact points of said wiper arm.

3. Electrical information encoding apparatus comprising a first commutator having a plurality of contact segments and a wiper arm movable to contact any one of said contact elements in accordance with information to be encoded, a plurality of output circuits each peculiar to one digit of a multi-digit code, coding circuits affording channels between each of said contact segments and a different combination of said output circuits in accordance with said multi-digit code, a second commutator having a plurality of contact segments and a wiper arm geared to the wiper arm of said first commutator, a further plurality of output circuits, coding circuits, affording channels between each of the contact segments of said second commutator and a different combination of said further output circuits in accordance with said multi-unit code, two contact points on the wiper arm of the second commutator and connections between one of the output circuits of the first commutator and said contact points to energise one or the other of said contact points in dependence upon the state of "mark" or "space" obtaining in said output circuit.

4. Apparatus for setting up a plurality of code element signals representative of the angular position with respect to a datum of a rotatable shaft comprising a commutator having a plurality of contact segments and a wiper arm movable in contact with said contact segments, a plurality of code element circuits each peculiar to a code element of a multi-digit code and each comprising a "mark" channel and a "space" channel, coding circuits affording connection from each of said contact segments to a different combination of "mark" and "space" channels in accordance with said multi-element code, an output circuit including a two-state valve circuit respectively associated with each of said code element circuits, a connection between the "mark" channel of the corresponding code element circuit and one part of said two-state valve circuit, a connection between the "space" channel of the corresponding code element circuit and another part of said two-state valve circuit whereby one voltage is applied to a given out-put circuit in response to energization of the corresponding "mark" channel and a different voltage is applied to said output circuit in response to energization of the corresponding "space" channel and a source of voltage connected to the wiper of said commutator to energize the combination of "mark" and "space" channels connected to whichever contact segment said wiper is contacting to set-up in said channels an appropriate combination of code element signals to represent the angular position of the shaft.

5. In a system for designating the angular position of a rotatable shaft as a series of $n$ digits, a plurality of $n$ output terminals, signal means coupled to each of said $n$ output terminals and producing one of two predetermined electrical states on each of said terminals, commutator means having a plurality of contact segments and movable wiper arm having two contact points, said contact points being so located with respect to said segments that only one of said points may make contact at a given time, a plurality of coding circuits coupled from each of said segments to $n$–1 of said signal means and causing said signal means to place a different combination of said two electrical states on each of said $n$–1 complementary output terminals when contact is made by a contact point with different contact segments, and means coupling said wiper arm to the remaining of said signal means, said last named means including means causing said remaining signal means to selectively place one of said two electrical states on said remaining output terminals in response to which of said two contact points is making contact with a segment.

6. In an indicating system, a rotatable shaft, a commutator having a plurality of commutator segments and a wiper arm, coupled to said shaft, having a plurality of contact points only one of which may contact a commutator segment at a given time, signal means coupled to said commutator and producing a characteristic output when contact is made by one of said contact points with one of said segments, said signal means producing a different output for each of said segments, and further signal means coupled to said commutator and producing a further characteristic output in response to which of said plurality of contact points is making contact with a segment.

7. The system of claim 6 in which said signal means comprises a plurality of bistable circuits each of which selectively produces one of two different electrical states, an impedance network coupled between each of said commutator segments and each of said bistable circuits, and a source of potential selectively coupled to said bistable circuits through said impedance network and causing said bistable circuits to assume different characteristic output combinations of said two electrical states when contact is made with different segments of said commutator.

8. The system of claim 7 in which said impedance network determines a different path of electrical continuity from each of said bistable circuits to said source of potential in response to contact by one of said contact points with different of said segments.

9. In an indicating system, a rotatable shaft, a first commutator coupled to said shaft, said first commutator having a first plurality of segments and a first wiper arm selectively contacting said segments, a first plurality of output terminals, a first electrical network coupled to said first commutator and to said first output terminals and causing predetermined combinations of two electrical states to be impressed on said first output terminals, said combinations being different for contact of said first wiper arm with different ones of said first segments, a second commutator coupled to said first commutator by gear means, the number of segments on said first commutator being equal to the gear ratio of said gear means, said second commutator including a second plurality of segments and a second wiper arm, said gear means coupling said first and second wiper arms, a second plurality of output terminals, and a second electrical network coupled to said second commutator and to said second output terminals and causing a further series of predetermined combinations of said two electrical states to be impressed on said second output terminals, said further series of combinations differing for contact of said second wiper arm with different of said second segments, and electrical coupling means from said first wiper arm to a predetermined point in said second electrical network.

10. The system of claim 9 in which said second wiper includes a plurality of contact points only one of which may contact one of said second segments at a given time, said second electrical network including means responsive to which of said contact points is contacting a commutator segment.

ERIC ARTHUR JOHNSON.

REFERENCES CITED

The following references are of record in the file of this patent:

UNITED STATES PATENTS

| Number | Name | Date |
|---|---|---|
| 2,207,743 | Larson | July 16, 1940 |
| 2,241,548 | Frischknecht | May 13, 1941 |
| 2,397,604 | Hartley | Apr. 2, 1946 |
| 2,435,257 | Wilder | Feb. 3, 1948 |
| 2,496,585 | Harper | Feb. 7, 1950 |
| 2,502,837 | Entz et al. | Apr. 4, 1950 |

FOREIGN PATENTS

| Number | Country | Date |
|---|---|---|
| 287,274 | Germany | Sept. 18, 1915 |
| 499,900 | Great Britain | Jan. 31, 1939 |